(12) United States Patent
Tang

(10) Patent No.: US 10,707,707 B2
(45) Date of Patent: Jul. 7, 2020

(54) ELECTRIC MACHINE ROTOR

(71) Applicant: Ford Global Technologies, LLC, Dearborn, MI (US)

(72) Inventor: Chun Tang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 483 days.

(21) Appl. No.: 15/379,658

(22) Filed: Dec. 15, 2016

(65) Prior Publication Data
US 2018/0175681 A1    Jun. 21, 2018

(51) Int. Cl.
*H02K 1/27* (2006.01)
*H02K 1/12* (2006.01)

(52) U.S. Cl.
CPC ............ *H02K 1/2706* (2013.01); *H02K 1/12* (2013.01); *H02K 1/2766* (2013.01); *B60Y 2400/60* (2013.01); *H02K 2213/03* (2013.01)

(58) Field of Classification Search
CPC .... H02K 1/2766; H02K 1/2706; H02K 1/276; H02K 1/2773
USPC ............ 310/156.11, 156.38, 156.53, 156.57, 310/156.56
See application file for complete search history.

(56) References Cited

U.S. PATENT DOCUMENTS

| | | | |
|---|---|---|---|
| 6,259,181 B1 | 7/2001 | Kawano et al. | |
| 6,300,703 B1 | 10/2001 | Kawano et al. | |
| 2013/0270952 A1* | 10/2013 | Jurkovic | H02K 1/2766 310/156.01 |
| 2015/0162790 A1* | 6/2015 | Isoda | H02K 1/2766 310/156.47 |

FOREIGN PATENT DOCUMENTS

| | | |
|---|---|---|
| EP | 1670119 A1 | 6/2006 |
| EP | 2991207 A1 | 3/2016 |

* cited by examiner

*Primary Examiner* — Nguyen Tran
(74) *Attorney, Agent, or Firm* — David B. Kelley; Brooks Kushman P.C.

(57) ABSTRACT

A vehicle may include an electric machine. The electric machine may include a stator surrounding sections stacked to form a rotor. Each of the sections may have nested pairs of permanent magnets radially spaced from a rotational axis of the rotor. Corresponding pairs of permanent magnets of each of the sections may be aligned along a direction of the rotational axis. Corresponding chambers adjacent to the permanent magnets may have different shapes such that corresponding pole arc angles are different.

19 Claims, 8 Drawing Sheets

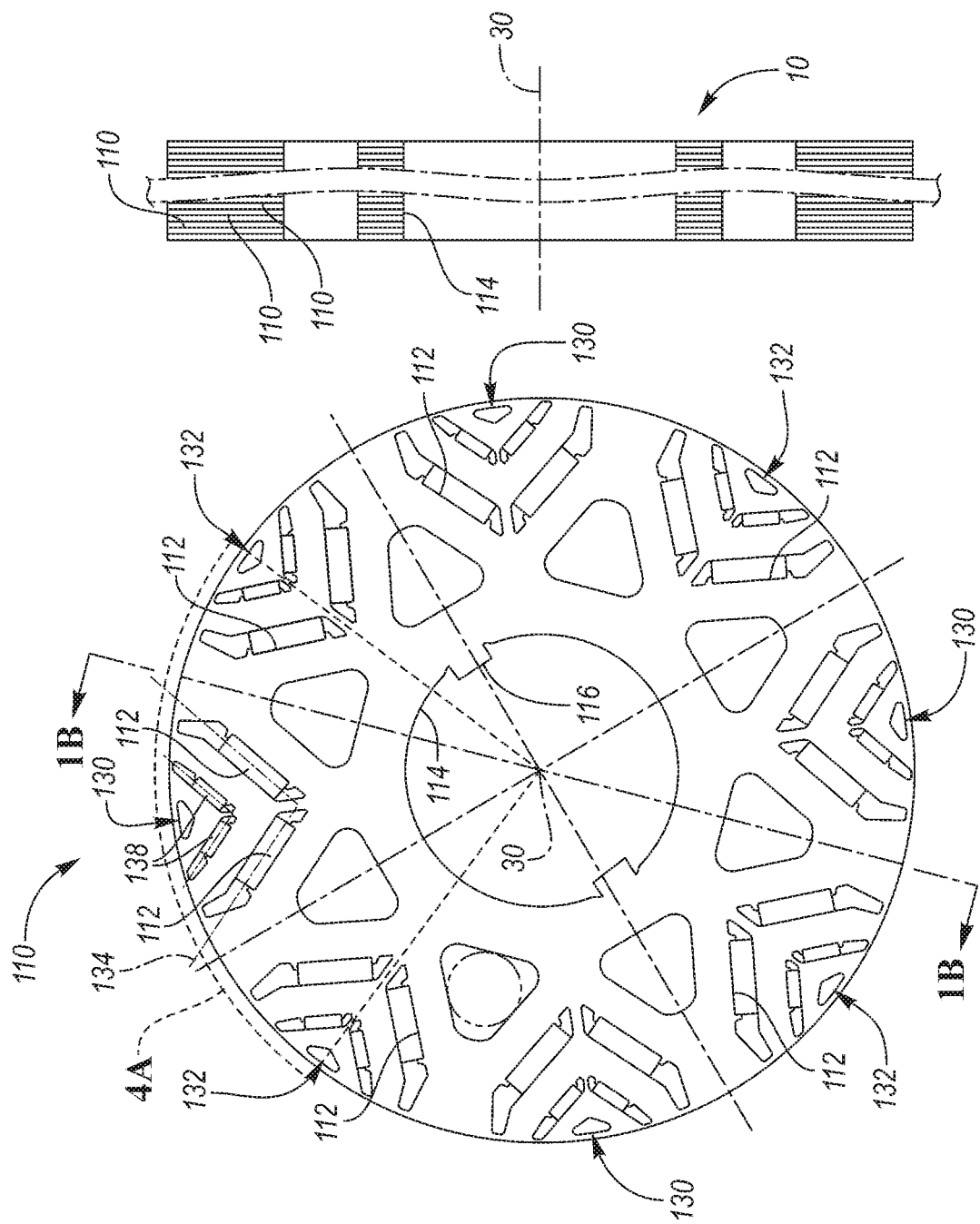

ELECTRIC MACHINE ROTOR

TECHNICAL FIELD

This disclosure relates to a rotor for permanent magnet electric machines.

BACKGROUND

Electric machines typically employ a rotor and stator to produce torque. Electric current flows through the stator windings to produce a magnetic field. The magnetic field generated by the stator may cooperate with permanent magnets within the rotor to generate torque.

SUMMARY

A vehicle may include an electric machine having a stator surrounding sections stacked to form a rotor. Some of the sections may have nested pairs of permanent magnets radially spaced from a rotational axis of the rotor. Corresponding pairs of permanent magnets of each of the sections may be aligned along a direction of the rotational axis. Corresponding chambers adjacent to the permanent magnets may have different shapes such that corresponding pole arc angles are different.

An electric machine may include a rotor including a first rotor section defining a first radially outer pocket layer from an axis of the rotor. The layer may have a first outer pole arc angle less than a first inner pole arc angle, which is defined by an associated first radially inner pocket layer. The first pole arc angles being formed by a first set of chambers corresponding with each of the first pocket layers. A second rotor section may be disposed adjacent to the first rotor section along the axis and defining a second radially outer pocket layer from the axis. The layer may have a second pole arc angle less than an associated second radially inner pocket layer and the first pole arc angle being less than the second pole arc angle. The second pole arc angle may be formed by a second set of chambers corresponding with each of the second pocket layers.

A vehicle may include an electric machine having a stator. A rotor may be surrounded by the stator. The rotor may have laminations stacked to form sections of the rotor defining a first pocket layer having a first set of permanent magnets stacked end to end to form a first shaft disposed therein. A second pocket layer being offset from the first pocket layer in a radial direction from an axis of the rotor having a second set of permanent magnets stacked end to end to form a second shaft disposed therein. The rotor may define a plurality of chambers associated with the pockets oriented to direct magnetic fields of the first and second sets such that first layer pole arc angles associated with a pair of adjacent sections are different and second layer pole arc angles associated with the pair are narrower than respective first layer pole arc angles.

BRIEF DESCRIPTION OF THE DRAWINGS

FIG. 1A is a plan view of a rotor lamination or section;

FIG. 1B is a side view of the rotor section comprised of a stack of laminations shown in FIG. 1A;

DETAILED DESCRIPTION

Figures 2A, 2B:
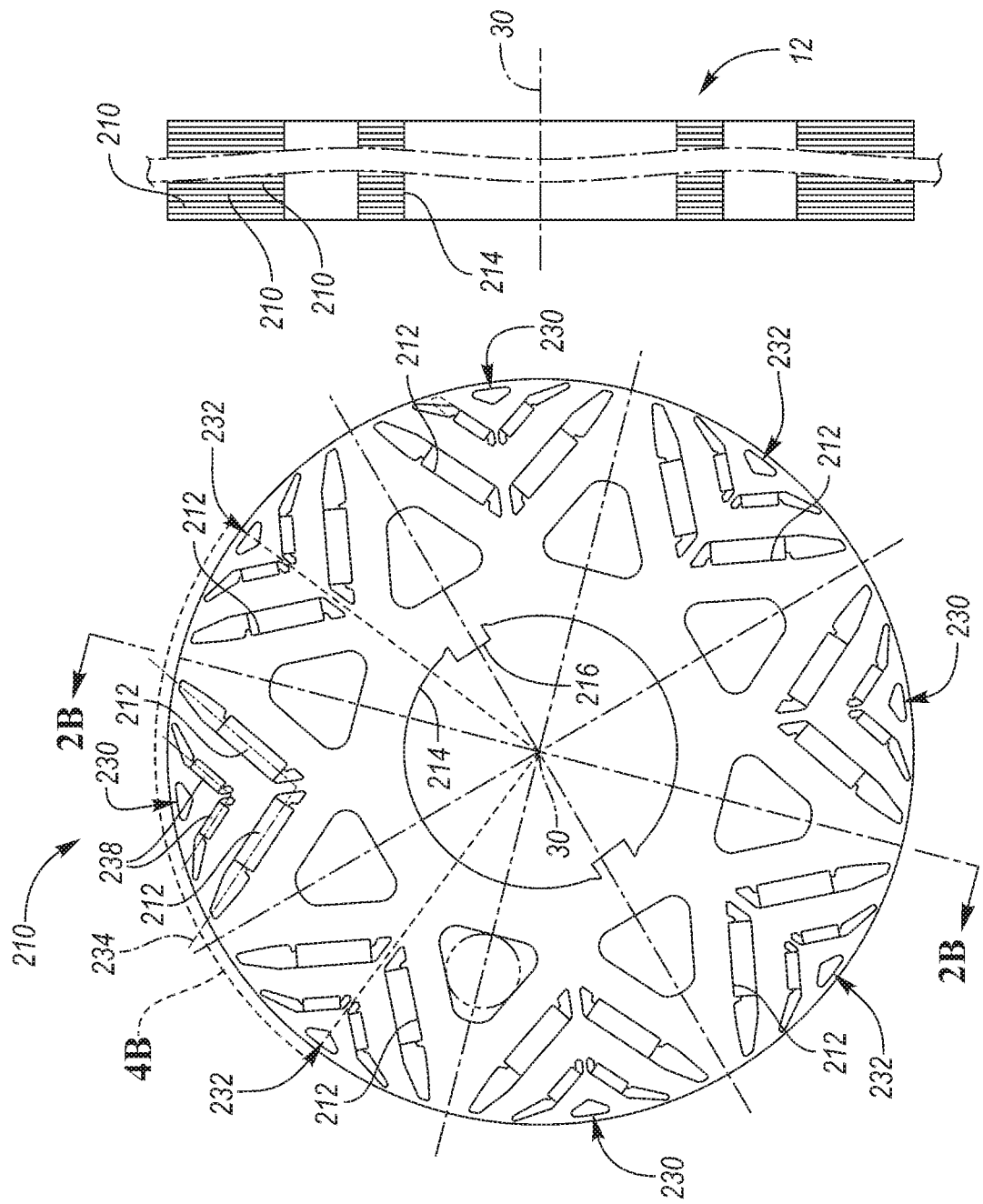
FIG. 2A is a plan view of a rotor lamination or section.
FIG. 2B is a side view of the rotor section comprised of a stack of laminations shown in FIG. 2A.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric machines are characterized by an undesirable oscillation in torque, which is caused by harmonics present in the airgap flux and in the airgap permeance. Most electric machines, and in particular Permanent Magnet (PM) electric machines, are designed with rotor skew (i.e., the poles of sections along the axis of the rotor are rotationally skewed relative to one another). Unfortunately, skewing may result in staggered permanent magnets and magnetic poles along the axis of the rotor. Skewed sections may cause an overall reduction in the average torque of the machine at all available speeds because the permanent magnets are out of alignment. Misalignment of the permanent magnets causes magnetic flux leakage. Thus, skewing helps to minimize torque harmonics, this results in an undesirable, yet previously essential, cost.

For example, an 8-pole machine with two rotor sections and 48-slot stator typically has a skew angle of 3.75°. Therefore, all of the features included in both sections of the rotor are rotationally offset by 3.75°. The skewing of the rotor is intended to produce a smoother mechanical torque through all frequencies than would otherwise be achieved using a rotor having aligned permanent magnets. Skewing may eliminate undesirable torque ripple caused by harmonics and many different skew angles may be used to achieve this result.

Permanent magnets of the rotor may be positioned or oriented in different ways to generate desirable magnetic fields. Each of the poles may be formed by a single permanent magnet oriented with one pole (i.e., north or south) in the radially outward direction. The poles of the rotor may be formed by groups of permanent magnets arranged to cooperatively form magnetic poles. One such arrangement orients the magnets in a V-shaped pattern. The interior portion of the "V" has similar magnetic poles that cooperate to form a magnetic pole of the rotor. An 8-pole rotor includes eight V-shaped patterns disposed about the rotor and spaced by 45°. Each of the permanent magnets may be disposed in pockets or cavities to retain the permanent magnets. These pockets or cavities are typically rectangular and sized to receive the permanent magnets. The cavities may be slightly oversized at opposite ends to limit magnetic flux leakage between north and south poles of the individual permanent magnets. Voids or cavities in the rotor core impede magnetic flux because a vacuum has a relatively low magnetic permeability compared to the rotor core material (e.g., electric steel).

Permanent magnets of the rotor may be nested or layered to increase the magnitude of the magnetic field and improve magnetic field direction. The nested permanent magnets may have nested V-shapes, curves, arcs, or circular configurations. The magnets may have a plurality of rows or layers that create magnetic field guides to the airgap between the rotor and stator.

The magnetic field in the airgap between the stator and rotor may be shaped or altered to produce an effect similar to mechanical skewing. Non-magnetically permeable cavities may be positioned about the permanent magnets to control the resulting flow patterns of magnetic flux to skew the poles magnetically. This magnetic skewing can minimize torque harmonics without skewing the whole rotor section including the permanent magnets. Alignment of the permanent magnetics improves the overall torque output of the electric machine.

The magnetic skewing method of torque ripple reduction, as disclosed above, may accompany or replace mechanical skewing. Magnetic skewing alters the form or shape of the magnetic field emanating from the permanent magnets using field forming cavities or chambers. The field forming chambers may adjust the arc angle of the magnetic pole. Each of the magnetic poles of an eight pole rotor is designated in a 45° portion of the rotor lamination. This 45° portion is referred to as a mechanical pole pitch. Instead of allowing all of the magnetic poles to have an arc angle of 45°, the field forming chambers may be defined to guide the flux from each pole by reducing or widening the arc angle, while still keeping the magnet pockets and permanent magnets aligned from end to end. The resulting arc angle from each of the poles may still accumulate to cover the entire 360° outer peripheral surface of the rotor or cover less than the entire outer peripheral surface of the rotor.

Magnetic skewing may alter the field forming cavities or chambers that impede magnetic flux leakage between north and south poles of the same magnet. To create magnetic skewing, this chamber may be improved by extending the chamber or adding a second chamber in the radial direction to form the magnetic field. The arc angle of any one of the given poles may be adjusted relative to the arc angle of a complementary, axially offset pole located on an adjacent section of the rotor. For example, the arc angle of one of the poles on Section A may be adjusted to 40° and the adjacent pole on section B may be adjusted to 35°. Dissimilar arc angles reduce harmonic effects that generally burden electric machines.

The maximum torque of the electric machine may be reduced by modifying the relative arc angles. The difference between adjacent arc angles may be optimized to minimize cogging or torque ripple and ensure a high level of maximum torque is provided. The modification of arc angles may reduce lulls in torque output. These competing interests may be optimized to ensure electric machine function is improved.

Some of the magnetic poles may maintain a standard pole arc angle. In some embodiments the magnetic field arc angle of each of the poles may be altered relative to adjacent rotor sections. In other embodiments a group or subgroup of the poles may be altered relative to adjacent rotor sections. For example, adjacent north poles of the rotor may have different field arc angles to mitigate torque ripple, while adjacent south poles of the rotor may have the same pole arc angles. Any combination of relative arc angles may provide an acceptable reduction in torque ripple or cogging.

The size of the arc angle can have a direct impact on the machine output torque and the iron losses in stator and rotor laminations. A rotor having sections with equal thicknesses may dampen torque harmonics at the cost of iron losses. For this reason, the thickness of the altered arc angle section may be differed relative to a section having an arc angle optimized for torque output.

Referring now to FIG. 1A, a lamination 110 for a rotor is shown. The lamination 110 may define a plurality of cavities 112, 138 adapted to hold permanent magnets in pockets. The cavities 112, 138 may be nested or layered to provide housing for additional permanent magnets. The center of the section 10 may define a circular central opening 114 with a keyway 116 for accommodating a driveshaft (not shown) that may receive a drive key such that the lamination 110 rotates about a rotational axis 30 of the rotor. The cavities may be oriented such that the permanent magnets (not shown) housed in the cavities 112 form eight alternating magnetic poles 130, 132. It is well known in the art that an electric machine may have various numbers of poles arranged about the rotor. The magnetic poles 130 may be configured to be north poles. The magnetic poles 132 may be configured to be south poles. The permanent magnets may also be arranged with different patterns. As shown in FIG. 1A, the cavities 112, which hold permanent magnets, are arranged with a V-shape 134. Referring now to FIG. 1B, a plurality of laminations 110 may form a Section A 10 of the rotor. The rotor has a circular central opening 114 for accommodating a driveshaft (not shown).

Referring now to FIG. 2A, a lamination 210 for a rotor is shown. The lamination 210 may define a plurality of cavities 212 adapted to hold permanent magnets in pockets. The cavities 212, 238 may be nested or layered to provide housing for additional permanent magnets. The center of the section 12 may define a circular central opening 214 with a keyway 216 for accommodating a driveshaft (not shown) that may receive a drive key such that the lamination 210 rotates about a rotational axis 30 of the rotor. The cavities may be oriented such that the permanent magnets (not shown) housed in the cavities 212 form eight alternating magnetic poles 230, 232. It is well known in the art that an electric machine may have various numbers of poles. The magnetic poles 230 may be configured to be north poles. The magnetic poles 232 may be configured to be south poles. The permanent magnets may also be arranged with different patterns. As shown in FIG. 2A, the cavities 212, which hold permanent magnets, are arranged with a V-shape 234. Referring now to FIG. 2B, a plurality of laminations 210 may form a Section B 12 of the rotor. The rotor has a circular central central opening 214 for accommodating a driveshaft (not shown).

Figures 3A, 3B:
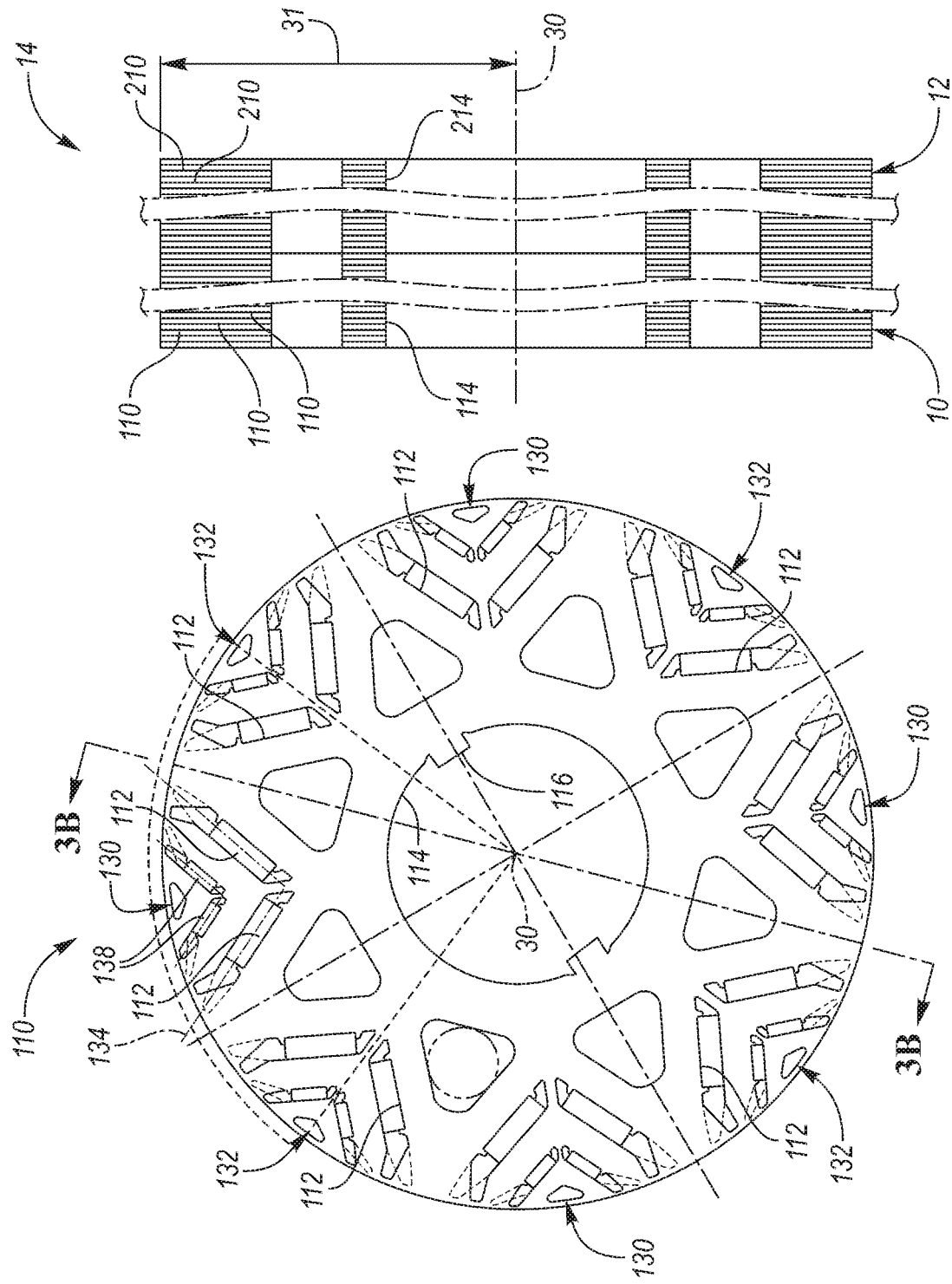
FIG. 3A is a plan view of an overlay of the rotor laminations of FIGS. 1A and 2A.
FIG. 3B is a side view of the rotor section comprised of a stack of laminations shown in FIGS. 1A and 2A.

Referring now to FIG. 3A, the section 10 from FIG. 1 is shown superposed on the section 12 from FIG. 2. As shown, the position of the cavities 112 from section 10 and cavities 212 from section 12 are substantially aligned. The difference between these two sections is the pole arc angle created by the dissimilar chambers. As shown in FIG. 3B, the sections are stacked to form the rotor. The sections have the same orientation and drive shaft hole 114, 214 and rotate about a rotational axis 30 of the rotor. Unlike mechanically skewed rotors, the rotor 14 or rotor portion provides an unobstructed path through the cavities 112, 212 when looking down the axis of the rotor, except for the dissimilarly oriented chamber portions 106, 206, as shown in FIGS. 4A-B.

Figure 4A:
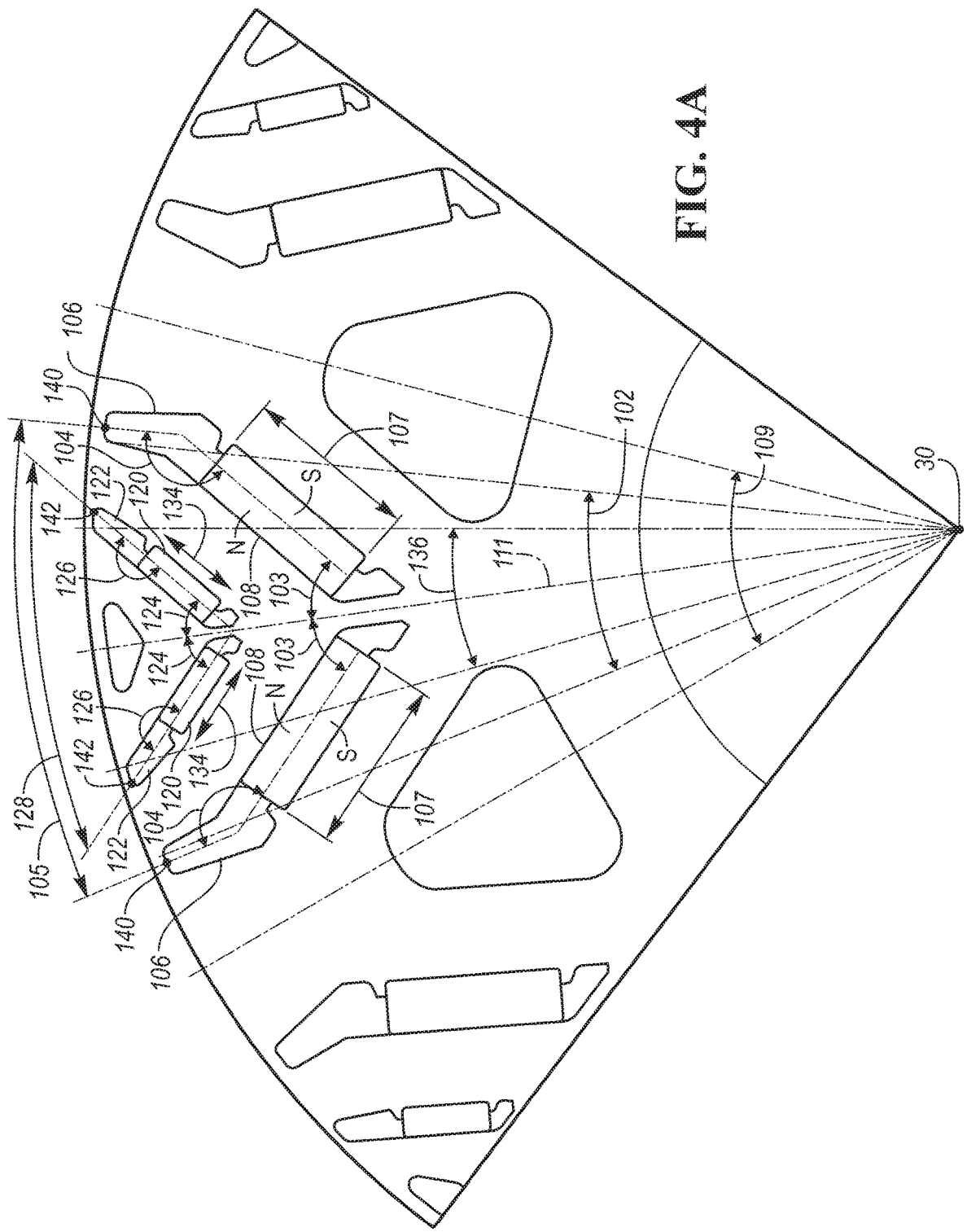
FIG. 4A is a diagrammatic view of an electric machine with a rotor comprised of nested pairs of permanent magnets having particular pole arc angles.
Figure 4B:
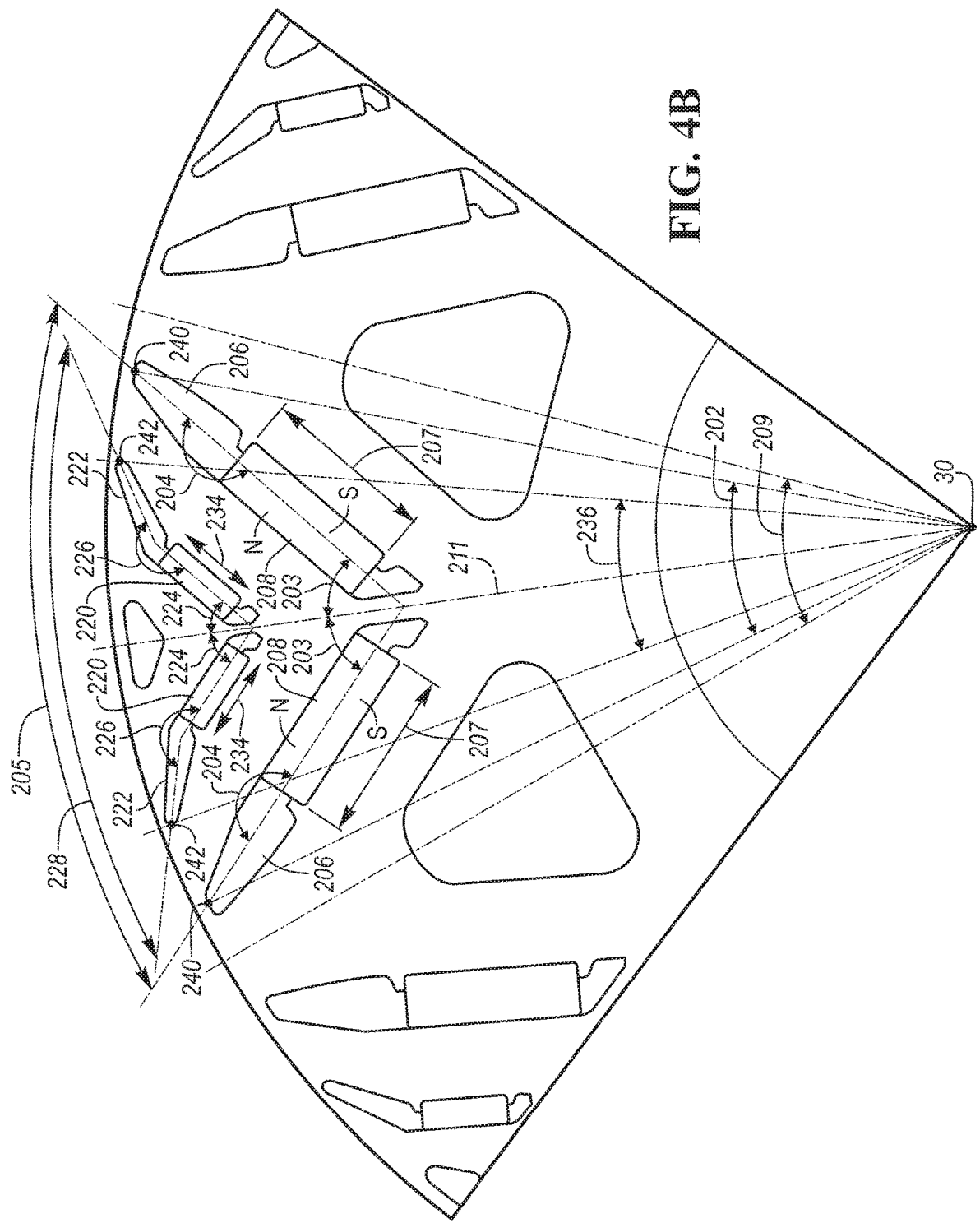
FIG. 4B is a diagrammatic view of an electric machine with a rotor comprised of nested pairs of permanent magnets having particular pole arc angles.

Referring now to FIG. 4A, the section 10 from FIG. 1B is shown having particular pole arc angles 102, 136 corresponding to the nested pairs of permanent magnets 108, 120 and the associated chambers 106, 122. The nested pairs of permanent magnets may also have a first radially outer pocket layer 108 from the axis 30. The nested pairs may have a first outer pole arc angle 136 that is less than a first inner pole arc angle 102. The pole arc angle 102 as shown is smaller than the pole arc angle 202 as discussed below. The pole arc angle 136 as shown is smaller than the pole arc angle 236 as discussed below. The pole arc angle is shaped by the angle of the chamber 106, 122 relative to the magnet pocket 108, 120. The section 10 may have a mechanical pole pitch 109 of 45°, as shown.

Pole arc angles 102, 136 may be measured using a variety of methods. As shown, pole arc angles 102, 136 are measured as the angle between the most distinguished inner corner of the most radially outward portion of chambers 106, 122 from the central axis of the rotor. The pole arc angles 102, 136 can also be measured from the outermost edges of chambers 106, 122, the inner edges of chambers 106, 122, or a hypothetical center of gravity (e.g., if the chambers were filled with a material, the center of gravity of that material). The pole arc angles 102, 136 can also be measured as angles 104, 126 between the V-shaped magnet pockets 108, 120 and chambers 106, 122.

The pole arc angles 102, 136 may also be measured using the length of arcs 105, 128 across the outer periphery of the rotor to define a surface. The surface may be defined by the length of the arc having a threshold magnitude of magnetic flux. For example, the shape of the features, chambers, may make it difficult to ascertain a generic definition and value for the pole arc angle. Under these circumstances, the magnetic flux crossing the length of the arcs 105, 128 or surface may be measured or estimated to determine the formed magnetic field. Measuring the result of the field-forming chamber may provide an improved indication of the desired pole arc angle instead of measuring the angle directly. This additional method may indirectly provide a comparison between the pole arc angles of the adjacent sections to determine whether magnetic skewing is used to reduce torque ripple.

The vertex for the corresponding pole arc angles 102, 136 may be determined as an intersection of an extension of the V-shaped permanent magnet pockets, an extension of the chambers, or a combination thereof. The vertex of the pole arc angle may also be the centroid of the section or lamination or the rotational axis 30. In another embodiment, the vertex may be offset from the rotational axis 30.

In at least one other embodiment, the pole arc angles are defined by corresponding magnet angles 103, 124 and orientation angle 104, 126 relative to the magnet angles 102, 124. The orientation angle 104 has a vertex defined at a point along an intersection of the pocket 108 and the chambers 106, 122. One leg of the orientation angle is defined by a centerline passing through a centroid of the permanent magnets 108, 120. The centerline may be defined based on a center of mass or symmetry of the pocket. The other of the legs of the angle may be defined by a centerline passing through a centroid of the chamber 106, 122. The centerline may be defined based on density or symmetry of the chamber. Any of the aforementioned methods or combinations thereof may be used to determine the pole arc angle of the Section A.

Referring now to FIG. 4B, the section 12 from FIG. 2B is shown having particular pole arc angles 202, 236 corresponding to the nested pairs of permanent magnets 208, 220 and the associated chambers 206, 222. The nested pairs of permanent magnets may also have a first radially outer pocket layer 208 from the axis 30. The nested pairs may have a first outer pole arc angle 236 that is less than a first inner pole arc angle 202. The pole arc angle 202 as shown is larger than the pole arc angle 102 as discussed above. The pole arc angle 136 of the inner pair of permanent magnets 120 may be larger or smaller than the corresponding inner pair of permanent magnets 220 on the adjacent section 12 to maximize the torque generated by the electric machine and diminish torque ripple. A channel is formed between each of the sets of permanent magnets in each section 10, 12. The channel ensures magnetic fields from the permanent magnets reach the airgap of the electric machine. The pole arc angle 236 as shown is larger than the pole arc angle 136 as discussed above. The pole arc angle is shaped by the angle of the chamber 206, 222 relative to the magnet pocket 208, 220. The section 12 may have a mechanical pole pitch 209 of 45°, as shown.

The pole arc angles 202, 236 can be measured using a variety of methods. As shown, the pole arc angles 202, 236 are measured as the angle between the most distinguished inner corner of the most radially outward portion of chambers 206, 222 from the central axis of the rotor. The pole arc angles 202, 236 can also be measured from the outermost edges of the chamber 206, 222, the inner edges of the chamber 206, 222, or a hypothetical center of gravity (e.g., if the chamber was filled with a material, the center of gravity of that material). The pole arc angle 202, 236 can also be measured as angles 204, 226 between the V-shaped magnets 208, 220, and chambers 206, 222.

The pole arc angle 202 may also be measured using the length of arcs 205, 228 across the outer periphery of the rotor to define a surface. The surface may be defined by the length of the arc having a threshold magnitude of magnetic flux. For example, the shape of the features, chambers, may make it difficult to ascertain a generic definition and value for the pole arc angle. Under these circumstances, the magnetic flux crossing the lengths of the arcs 205, 228 or surface may be measured to determine the formed magnetic field. Measuring the result of the field-forming chamber may provide an improved indication of the desired pole arc angle instead of measuring the angle directly. This additional method may indirectly provide a comparison between the pole arc angles of the adjacent sections to determine whether magnetic skewing is used to reduce torque ripple.

The vertex for the angle may be determined as an intersection of an extension of the V-shaped permanent magnet pockets, an extension of the chambers, or a combination thereof. The vertex of the pole arc angle may also be the centroid of the section or lamination or the axis of rotation of the rotor.

In at least one other embodiment, the pole arc angles are defined by magnet angles 203, 224 and orientation angles 204, 226 relative to the magnet angle. The orientation angle 204, 226 has a vertex defined at a point along an intersection of pockets or permanent magnets 208, 220 and chambers 206, 222. One leg of the orientation angle is defined by a centerline passing through a centroid of pockets 208, 220. The centerline may be defined based on density or symmetry of the pocket. The other of the legs of the angle may be defined by a centerline passing through a centroid of chambers 206, 222. The centerline may be defined based on density or symmetry of the chamber. Any of the aforementioned methods or combinations thereof may be used to determine the pole arc angle of the Section B.

The orientation or bending angles 104, 204, 126, 226 may be determined by the relationship described in Equation 1.

$$\beta = 270° - \alpha - \tan^{-1}\frac{R_r\cos\left(\frac{\theta}{2}\right) - R_c - w_m\cos\alpha}{R_r\sin\left(\frac{\theta}{2}\right) - w_m\sin\alpha} \quad (1)$$

where the β, orientation angle 104, 204, 126, 226 is equal to a function of the magnet angle α 103, 203, 124, 224, the width of the permanent magnet pocket $w_m$ 107, 207, 134, 234, the pole arc angle θ 102, 202, 136, 236 the radial distance to each inner vertex of the V-shaped magnet pairs, $R_c$, and the rotor outer radius, $R_r$.

The orientation angle 104, 204, 126, 226, β, may be set between an angle relative to the magnet angle 103, 203, 124, 224, α, as disclosed in Equation 2 below.

$$(180°-\alpha) \leq \beta \leq (270°-\alpha) \quad (2)$$

Other features (e.g., holes, cavities) generally included on rotor laminations to control magnetic fields may be included or not included to properly form magnetic fields in the air gap.

The relationship between pole arc angles corresponding the nested pairs of permanent magnets or layers of pockets may be defined by Equation 3. A difference between the pole arc angle of the first radially outer pocket layer 136, $\theta_{A1}$, and the second radially outer pocket layer 236, $\theta_{B1}$, may be equal to a slot pitch 42 of the stator or based on a number of slots of the stator. A difference between the first radially inner pocket layer 102, $\theta_{A2}$, and the second radially inner pocket layer 202, $\theta_{B2}$ may be equal to the slot pitch 42 or based on the number of slots of the stator.

In certain embodiments, Equation 3 may be true. For example, the first radially outer pocket layer 136, $\theta_{A1}$, and the second radially outer pocket layer 236, $\theta_{B1}$, may be equal to a slot pitch 42 of the stator or based on a number of slots of the stator, but the first radially inner pocket layer 102, $\theta_{A2}$, and the second radially inner pocket layer 202, $\theta_{B2}$ are not equal to the slot pitch 42 or based on the number of slots of the stator.

$$\theta_{B1} - \theta_{A1} = \frac{360°}{S} \quad (3)$$

In another embodiment, Equation 4 may be true. For example, the first radially outer pocket layer 136, $\theta_{A1}$, and the second radially outer pocket layer 236, $\theta_{B1}$, may not be equal to a slot pitch 42 of the stator or based on a number of slots of the stator, but the first radially inner pocket layer 102, $\theta_{A2}$, and the second radially inner pocket layer 202, $\theta_{B2}$ are equal to the slot pitch 42 or based on the number of slots of the stator.

$$\theta_{B2} - \theta_{A2} = \frac{360°}{S} \quad (4)$$

In a preferred embodiment, the first radially outer pocket layer 136, $\theta_{A1}$, and the second radially outer pocket layer 236, $\theta_{B1}$, are equal to a slot pitch 42 of the stator or based on a number of slots of the stator, and the first radially inner pocket layer 102, $\theta_{A2}$, and the second radially inner pocket layer 202, $\theta_{B2}$ are equal to the slot pitch 42 or based on the number of slots of the stator, as disclosed in Equation 5.

$$\theta_{B1} - \theta_{A1} = \theta_{B2} - \theta_{A2} = \frac{360°}{S} \quad (5)$$

In a preferred embodiment, the rotor may have 8-poles. The mechanical pole-pitch of the rotor is 45°. The preferred angle for the second radially inner pocket layer 202, $\theta_{B2}$, is 37.5°. For a 48-slot machine, the slot pitch is 7.5°. Therefore, the first radially inner pocket layer 102, $\theta_{A2}$, is 30°. Additionally, the second radially outer pocket layer 236, $\theta_{B1}$, is 22.5°, and the first radially outer pocket layer 136, $\theta_{A1}$, is 15°.

Additionally, the difference between pole arc angles of the same section may meet the following equations optimization equations. The difference between the inner and outer layers or nested permanent magnets may be greater than zero to ensure that a channel exists between the layers, as shown in Equation 6. The difference between the inner and outer layers may be less than a maximum of the mechanical pole arc angle of the machine 109, 209, $$\frac{360°}{P},$$

less the inverse sine of the product of the magnet width 134, 234, $w_{m1}$ of the outer layer magnet, and the sine of the magnet angle 124, 224, $\alpha_1$, divided by the radius 31, $R_r$, of the rotor, as shown in FIG. 3. Equation 6 may be adjusted to compensate for different pole arc calculations as discussed above. The equation ensures a channel is formed between the nested permanent magnets or layers and ensures the nested pole arc angles have relative pole arc angles configured to generate maximum torque in the airgap with reduced torque ripple.

$$0 < \theta_{n2} - \theta_{n1} < \frac{360°}{P} - 2*\sin^{-1}\left(\frac{w_{m1}*\sin(\alpha_1)}{R_r}\right) - \frac{360°}{S} \quad (6)$$

Figure 5A:
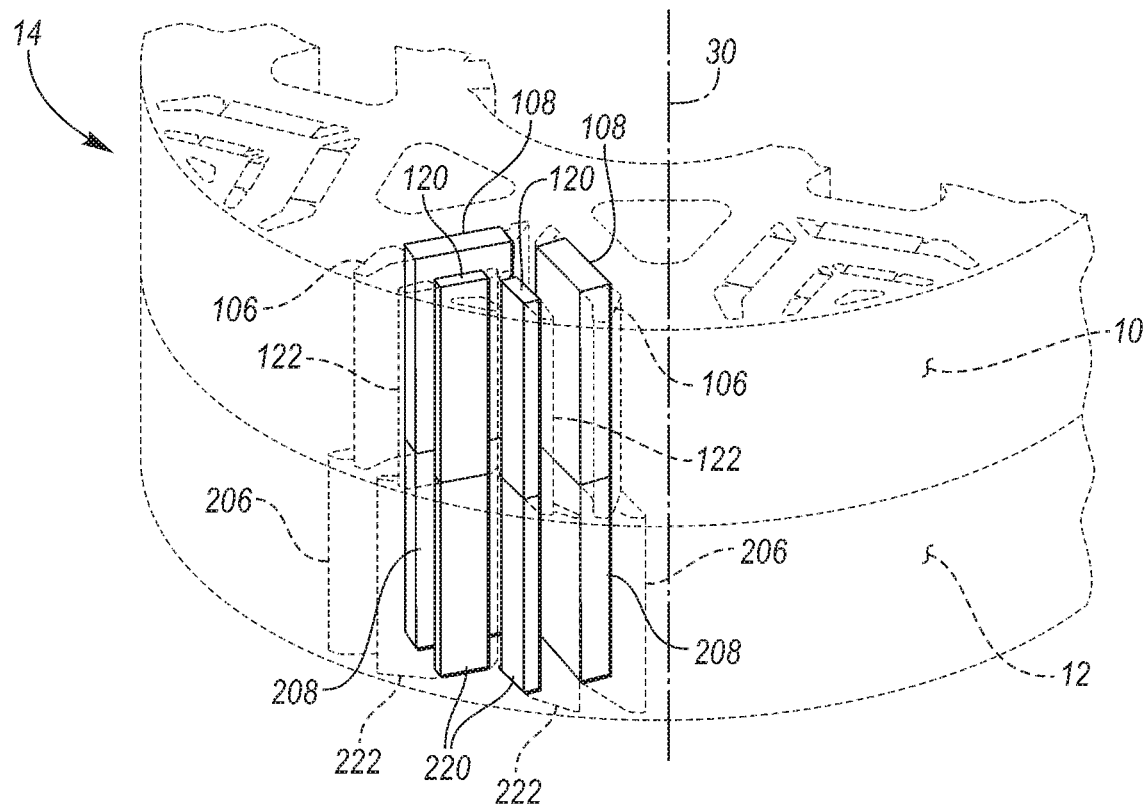
FIG. 5A is a perspective view of an electric machine rotor having dissimilarly situated magnetic field formation chambers.

Now referring to FIG. 5A, two sections 10, 12 are stacked to form a portion of a rotor. The sections have aligned permanent magnet pockets 108, 208, which are retaining permanent magnets. The field forming chambers 106, 206 associated with each section form different pole arc angles to create magnetic skewing without skewing the magnets.

Figure 5B:
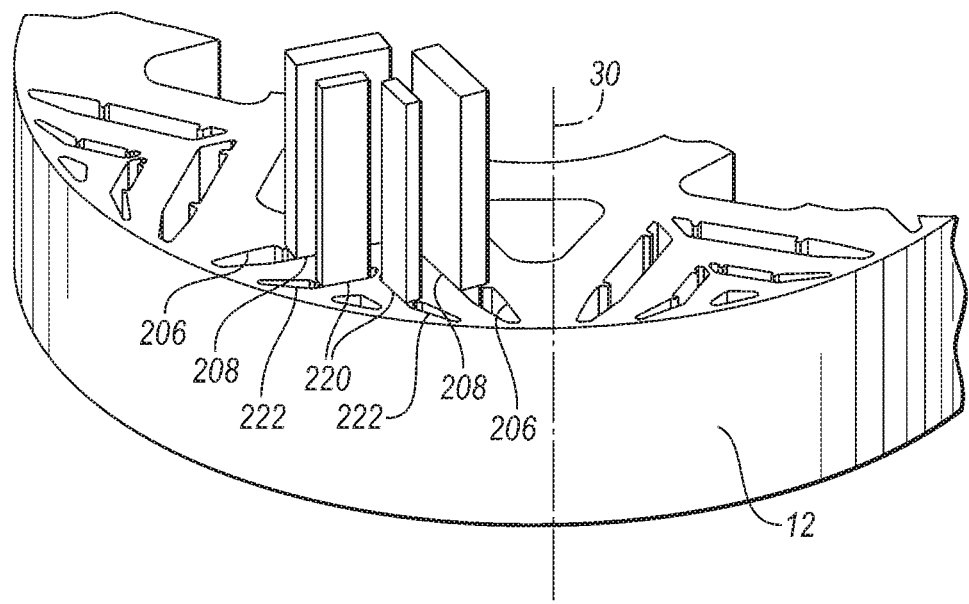
FIG. 5B is a perspective view of an electric machine rotor having dissimilarly situated magnetic field formation chambers and the upper section removed.

FIG. 5B additionally shows the alignment of the magnets of both sections and the associated pockets 208 and chambers 206.

Figure 6:
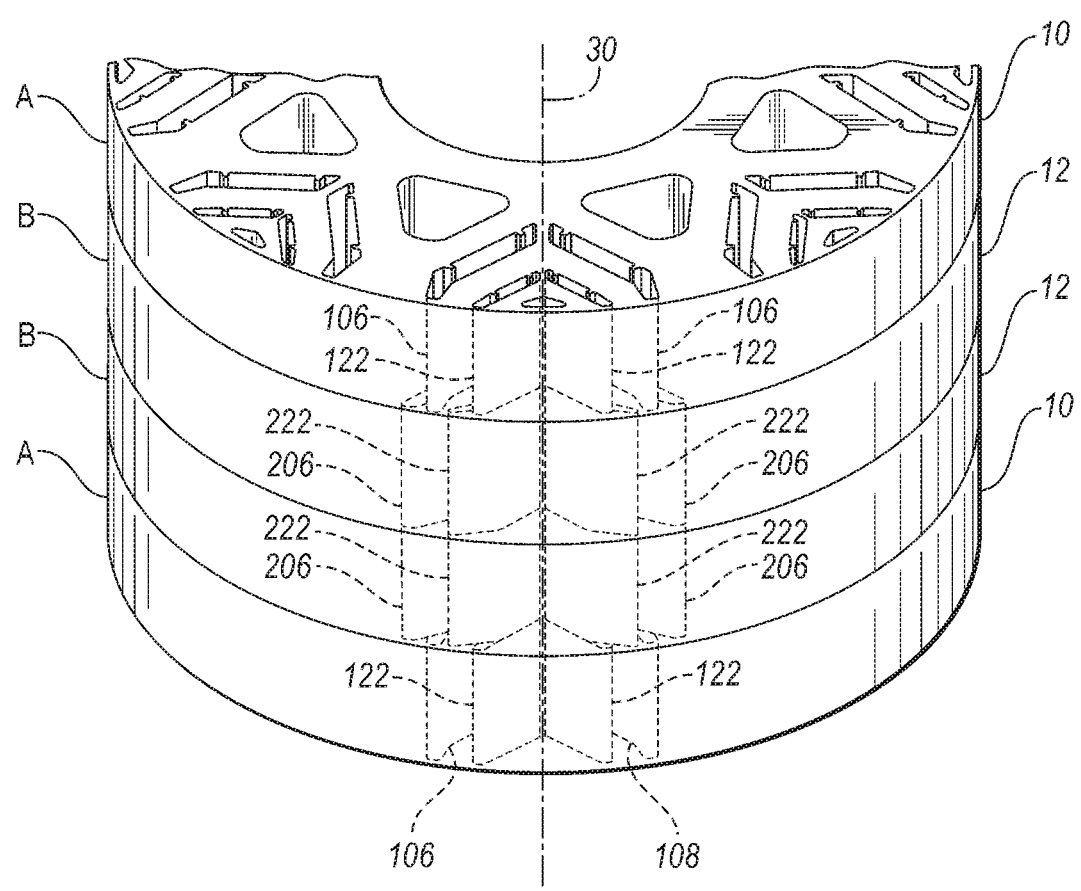
FIG. 6 is a perspective view of a rotor with an ABBA configuration.

Now referring to FIG. 6, a full ABBA rotor is depicted. The rotor includes multiple stacked sections 10, 12 to form a magnetically skewed rotor. Each section 10, 12 has a particular pole arc angle formed by the permanent magnets and chambers 106, 206. As shown, the permanent magnets are aligned such that minimal magnetic field leakage occurs between the sections. This configuration would also allow a single permanent magnet to traverse through each of sections, instead of multiple permanent magnets. An alternative BAAB rotor can be obtained by swapping the stacking sequence of section A and B (not shown). An alternative could also be ABAB or BABA.

Figure 7:
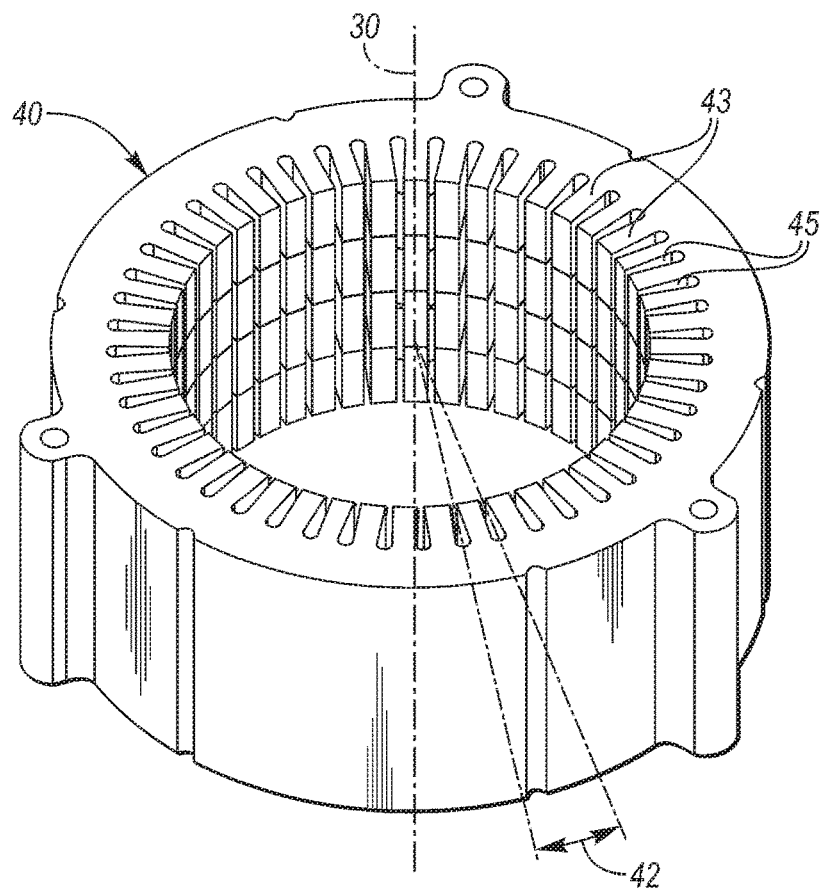
FIG. 7 is a perspective view of a stator.
Figure 8:
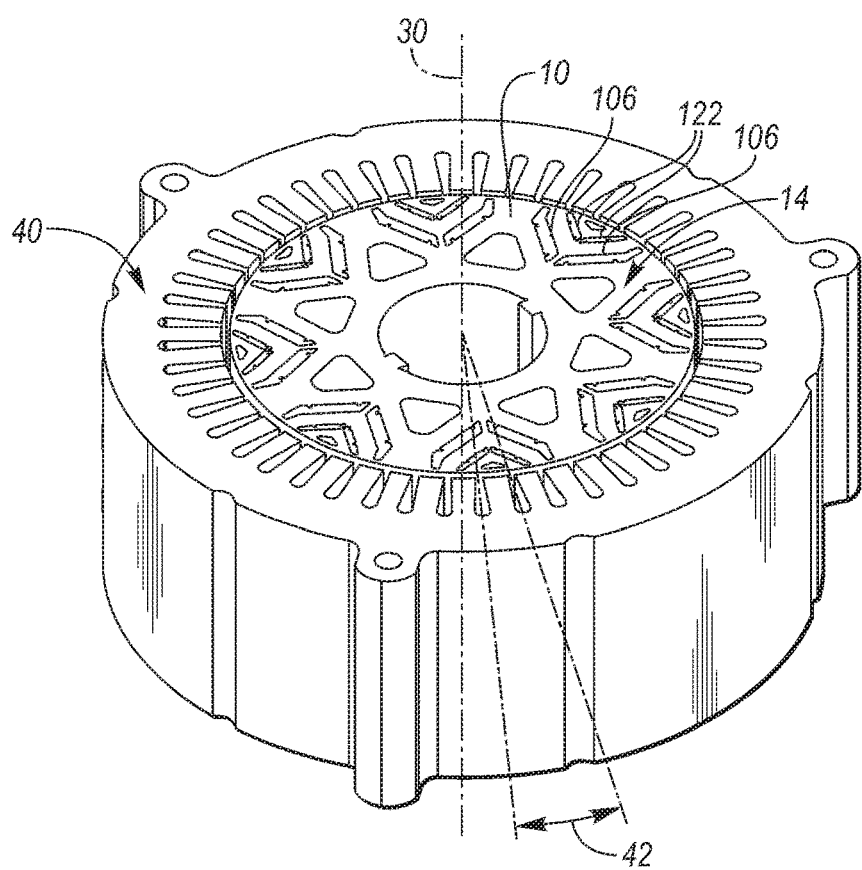
FIG. 8 is a perspective view of an electric machine having a stator and a rotor.

Now referring to FIGS. 7 and 8, a stator 40 is shown. The stator 40 has teeth 43 and stator winding cavities or slots 45 to support a set of stator windings. The stator 40 may surround a rotor 14 having a plurality of rotor sections 10, 12 (12 not shown) having permanent magnet pockets 108, 208 (208 not shown) arranged therein. Some of the sections are not shown. The difference between the pole arc angle may be equal to the slot pitch 42 of the stator. The slot pitch 42 is the mechanical angle between adjacent slots arranged around the entire stator 40. For example, a 48-slot stator 40 has a slot pitch 42 of 7.5 degrees. The difference between the pole arc angles may be equal to the slot pitch 42 of the stator 40.

The corresponding pole arc angles may be defined by a pocket angle defined by 1) an orientation of the respective pocket layer from a radial vector 111, 211 passing through a midline of the respective pocket layer 108, 120, 208, 220, 2) chamber orientation angles 104, 126, 204, 226 defined by an orientation of the chamber relative to the respective pocket layer, 3) a width of the respective pocket layer 107, 4) a radius of the rotor, 5) and a radial distance between the axis and the midline.

The pocket layers 112, 138, 212, 238 may define pockets sized to retain permanent magnets 108, 120, 208, 220 in a V-shape oriented such that legs of the V-shape open radially outward and endpoints 140, 142, 240, 242 of the legs are equidistant from an outer periphery 115 of the rotor.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle subsystem comprising:
an electric machine including a stator surrounding sections stacked to form a rotor, each of the sections having nested pairs of permanent magnets radially spaced from a rotational axis of the rotor, corresponding pairs of permanent magnets of each of the sections being aligned along a direction of the rotational axis, and corresponding chambers adjacent to the permanent magnets having different shapes such that corresponding pole arc angles are different.

2. The vehicle subsystem of claim 1, wherein the nested pairs of permanent magnets are a radially inner and a radially outer layer having different pole are angles.

3. The vehicle subsystem of claim 2, wherein the pole arc angles associated with the layers of the other one of the sections are different.

4. The vehicle subsystem of claim 2, wherein a difference between the pole arc angles associated with the layers of one of the sections is less than a mechanical pole pitch of the rotor.

5. The vehicle subsystem of claim 4, wherein the difference between the pole arc angles associated with the layers of one of the sections is less than a difference between the mechanical pole pitch of the rotor and a slot pitch of the stator.

6. The vehicle subsystem of claim 4, wherein the difference between the pole arc angles associated with the layers of one of the sections is less than a difference between (i) the mechanical pole pitch and (ii) a sum of an inverse sine of a product of magnet width, a sine of a magnet angle, and a radius of the rotor.

7. The vehicle subsystem of claim 2, wherein a difference between corresponding pole arc angles of the radially inner layers is a slot pitch of the stator.

8. The vehicle subsystem of claim 2, wherein a difference between corresponding pole arc angles of the radially outer layers is a slot pitch of the stator.

9. The vehicle subsystem of claim 1, wherein a difference between the corresponding pole arc angles is a slot pitch of the stator.

10. An apparatus comprising:
an electric machine including a stator surrounding sections stacked to form a rotor, the sections having nested pairs of permanent magnets radially spaced from a rotational axis of the rotor, corresponding permanent magnets of the sections being aligned along a direction of the rotational axis, and corresponding chambers next to the permanent magnets and of adjacent sections being in partial registration and having different shapes such that corresponding pole arc angles of the adjacent sections are different.

11. The apparatus of claim 10, wherein the nested pairs of permanent magnets are a radially inner and a radially outer layer having different pole arc angles.

12. The apparatus of claim 11, wherein the pole are angles associated with the layers of the other one of the sections are different.

13. The apparatus of claim 11, wherein a difference between the pole arc angles associated with the layers of one of the sections is less than a mechanical pole pitch of the rotor.

14. The apparatus of claim 13, wherein the difference between the pole arc angles associated with the layers of one of the sections is less than a difference between the mechanical pole pitch of the rotor and a slot pitch of the stator.

15. The apparatus of claim 13, wherein the difference between the pole arc angles associated with the layers of one of the sections is less than a difference between (i) the mechanical pole pitch and (ii) a sum of an inverse sine of a product of magnet width, a sine of a magnet angle, and a radius of the rotor.

16. The apparatus of claim 11, wherein a difference between corresponding pole arc angles of the radially inner layers is a slot pitch of the stator.

17. The apparatus of claim 11, wherein a difference between corresponding pole arc angles of the radially outer layers is a slot pitch of the stator.

18. The apparatus of claim 10, wherein a difference between the corresponding pole arc angles is a slot pitch of the stator.

19. An apparatus comprising:
an electric machine including a stator surrounding sections stacked to form a rotor, the sections having pairs of permanent magnets radially spaced from a rotational axis of the rotor, corresponding permanent magnets of the sections being aligned along a direction of the rotational axis, and corresponding chambers next to the permanent magnets and of adjacent sections being in partial registration and having different shapes such that corresponding pole arc angles of the adjacent sections are different.

\* \* \* \* \*